J. H. SMITH & C. NUTTALL.
GEAR BOX.
APPLICATION FILED MAY 21, 1912.

1,164,419.

Patented Dec. 14, 1915.
3 SHEETS—SHEET 1.

Witnesses.—

Inventors.—
James H. Smith.
Charles Nuttall.
by their Attorneys

UNITED STATES PATENT OFFICE.

JAMES HOYLE SMITH, OF SALFORD, AND CHARLES NUTTALL, OF MARPLE, ENGLAND.

GEAR-BOX.

1,164,419.

Specification of Letters Patent.

Patented Dec. 14, 1915.

Application filed May 21, 1912. Serial No. 698,779.

*To all whom it may concern:*

Be it known that we, JAMES HOYLE SMITH and CHARLES NUTTALL, both subjects of the King of Great Britain and Ireland, and residing at Spring Bank, Eccles New Road, Salford, in the county of Lancaster, England, and 41 Church lane, Marple, in the county of Chester, England, respectively, have invented Improvements in Gear-Boxes, of which the following is a specification.

The object of this invention is to provide means for coupling a gear box, with the gearing complete therein, to a fixed casing of a vehicle so that it can be easily and quickly removed therefrom in order that any slight repairs may be made and the box replaced in alinement with the other parts of the vehicle. This object we attain in the following manner, reference being had to the accompanying drawings, in which:—

Figure 1:
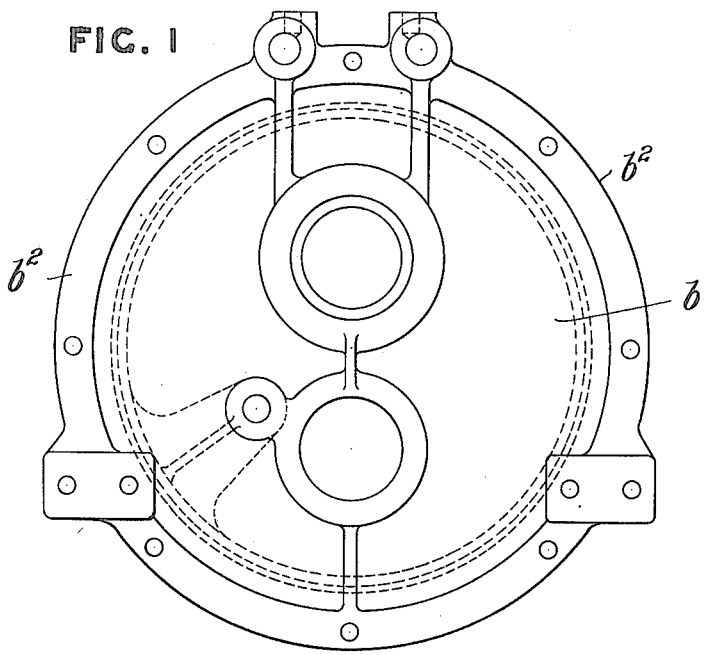
Figure 2:
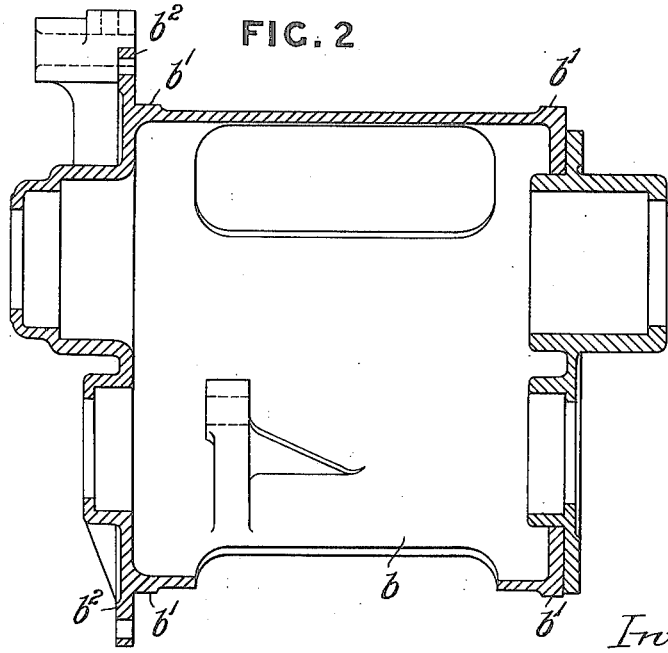
Figure 3:
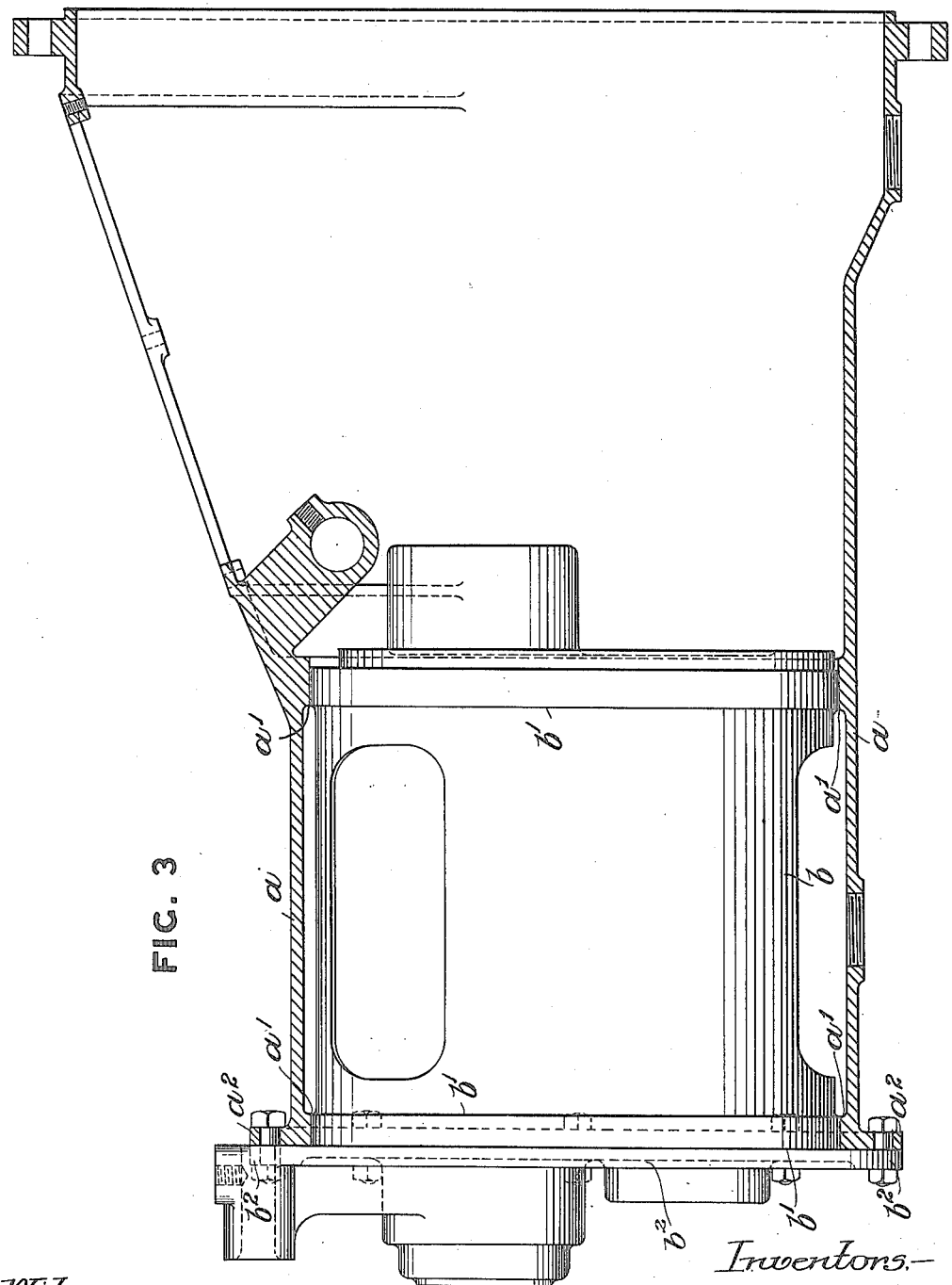
Figure 4:
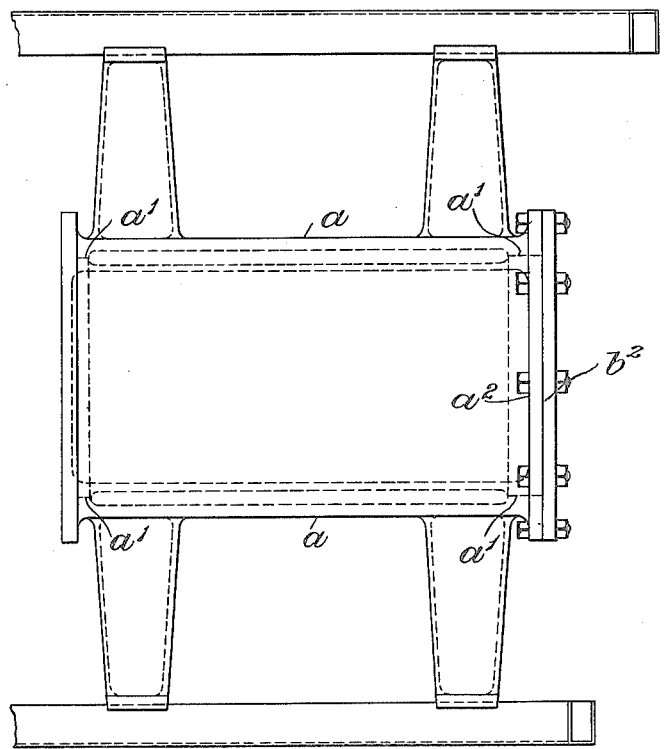

Figure 1, is an end view of a gear box; the gearing being omitted; Fig. 2, is a longitudinal sectional view of said box; Fig. 3, is a longitudinal sectional view of the casing forming an extension of the engine casing and in which the gear box is mounted; Fig. 4, is a modification, showing the casing supported on the frame of the vehicle and containing the gear box.

Referring to the drawings, $a$ is the casing, as illustrated in Fig. 3, forming an extension of the casing of an internal combustion engine, although it may form an extension of any motor by which the vehicle is driven. This casing is properly bored to receive the gear box $b$. We preferably form annular, internal ribs $a'$ on the casing and also form external ribs $b'$ at each end of the gear box; fitting the ribs $a'$, as clearly shown in Fig. 3. On the end of the casing is an annular external flange $a^2$ and the gear box has a flange $b^2$. The two flanges are secured together by bolts which pass through openings in the said flanges so as to rigidly hold the gear box to the casing: The gear box has bearings, as shown, for the shaft on which the gear wheels are mounted and the box is so proportioned that the gearing is contained therein so that when the bolts are removed which fasten the gear box to the casing, the box, with the gearing complete, can be withdrawn from the casing and the necessary examinations and repairs made, after which the casing can be replaced and when the bolts are in their proper position the alinement of the parts is assured.

In Fig. 4 of the drawings, is shown a modification in which the casing is secured to the frame of the vehicle; the casing having been properly alined with the engine and with the other mechanism of the vehicle so that when it is desired to remove the casing, the gears with the casing can be easily withdrawn and replaced without the necessity of realining the parts.

While we have shown two forms of casings, it will be understood that the form of casing may be modified without departing from the essential features of the invention.

The position of the casing will depend upon the type of vehicle to which the invention is applied.

We claim:

1. The combination of a gear box containing gearing and having a flange at one end; a rigidly mounted supplementary casing forming a continuation of the engine casing of a motor driven vehicle in which the gear box is mounted, said supplementary casing having a flange at one end, with bolts securing the flange of the gear box to that of the casing so as to firmly hold the gear box in position in said supplementary casing.

2. The combination of a gear-box for motor driven vehicles having annular flanges at each end, of the same diameter, a casing rigidly secured to the vehicle and having an opening therein for the reception of the body of said gear-box, said casing being provided with seats for annular engagement with the flanges of the gear-box whereby the latter is supported by the casing, and means for securing the gear-box to the casing.

3. The combination of a gear-box for motor driven vehicles having annular flanges of the same diameter at each end, a rigidly mounted supplementary casing forming an extension of the engine casing and having an opening therein for the reception of the body of said gear-box as an entirety, said supplementary casing being provided with seats for annular engagement with the flanges of the gear-box whereby the latter is supported by said flanges and seats in proper alinement; and means for securing the gear-box in said casing.

4. The combination of a gear box containing gearing, a rigidly mounted casing forming a continuation of the engine casing of a motor driven vehicle and in which said gear box is mounted, and means for securing said box in said casing.

In testimony whereof, we have signed our names to this specification, in the presence of two subscribing witnesses.

JAMES HOYLE SMITH.
CHARLES NUTTALL.

Witnesses:
THOMAS PRESCOTT,
HAROLD WALBER.